(12) United States Patent
Leijon et al.

(10) Patent No.: US 8,288,881 B2
(45) Date of Patent: Oct. 16, 2012

(54) WAVE POWER UNIT, A BUOY, USE OF A WAVE POWER UNIT AND A METHOD FOR PRODUCING ELECTRIC ENERGY

(75) Inventors: Mats Leijon, Uppsala (SE); Erland Strömstedt, Uppsala (SE)

(73) Assignee: Seabased AB, Uppsala (SE)

( * ) Notice: Subject to any disclaimer, the term of this patent is extended or adjusted under 35 U.S.C. 154(b) by 457 days.

(21) Appl. No.: 12/596,106

(22) PCT Filed: Apr. 18, 2007

(86) PCT No.: PCT/SE2007/050252
§ 371 (c)(1),
(2), (4) Date: Oct. 15, 2009

(87) PCT Pub. No.: WO2008/130295
PCT Pub. Date: Oct. 30, 2008

(65) Prior Publication Data
US 2010/0084869 A1  Apr. 8, 2010

(51) Int. Cl.
*F03B 13/10* (2006.01)
*F03B 13/12* (2006.01)
*H02P 9/04* (2006.01)

(52) U.S. Cl. ........................................................ 290/53

(58) Field of Classification Search .................... 290/42, 290/53
See application file for complete search history.

(56) References Cited

U.S. PATENT DOCUMENTS

| 5,986,349 | A | 11/1999 | Eberle | 290/53 |
| 7,045,912 | B2* | 5/2006 | Leijon et al. | 290/42 |
| 7,164,212 | B2* | 1/2007 | Leijon et al. | 290/42 |
| 2003/0121255 | A1 | 7/2003 | Dick | |
| 2004/0251692 | A1* | 12/2004 | Leijon et al. | 290/42 |
| 2005/0099010 | A1 | 5/2005 | Hirsch | |
| 2005/0121915 | A1* | 6/2005 | Leijon et al. | 290/42 |

FOREIGN PATENT DOCUMENTS

| WO | 9832967 | 7/1998 |
| WO | 03058055 | 7/2003 |
| WO | 2005085632 | 9/2005 |

* cited by examiner

*Primary Examiner* — Javaid Nasri
(74) *Attorney, Agent, or Firm* — Dykema Gossett PLLC

(57) ABSTRACT

A wave power unit including a buoy, adapted to float on a water surface (2), and a electric generator is connected to the buoy through connection means (4, 12, 13). The buoy when floating on a water surface (2) and when seen in a direction perpendicular to the water surface has the shape of a closed loop enclosing a inner opening substantially free of elements related to the wave power unit.

9 Claims, 3 Drawing Sheets

WAVE POWER UNIT, A BUOY, USE OF A WAVE POWER UNIT AND A METHOD FOR PRODUCING ELECTRIC ENERGY

FIELD OF INVENTION

The present invention in a first aspect relates to a wave power unit including a buoy adapted to float on a water surface, an electric generator and mechanical connection means connecting the buoy to the electric generator.

In a second aspect, the invention relates to a buoy for a wave power unit.

In a third and a fourth aspect, the invention relates to the use of the invented wave power unit and to a method for producing electric power respectively.

BACKGROUND ON THE INVENTION

Wave power energy has developed to be one of the renewable energy sources that can be of great importance for meeting the challenge to replace the traditional energy sources. The total wave power energy resources around the costs of the continents is huge and the technically exploitable part thereof is also considerable.

As is the case for many of the renewable energy sources, the economy for converting this energy into usable electric energy is the crucial aspect. In order to achieve that electric energy produced from wave energy will become competitive with the traditional ways of producing energy it is necessary to technically and economically optimize each link in the production chain. The present invention is focused on optimizing the design of the buoy used in a wave power unit.

Wave power units for producing electric energy on a larger scale are disclosed e.g. in WO 03/058055.

Traditionally the buoy of such a wave power unit has been formed as a quite compact body having the shape of a sphere, a flat cylinder or a double cone. No particular attention has been paid to the fact that the shape of the buoy affects the efficiency of the buoy to convert the wave energy into mechanical energy.

The object of the present invention is to solve the problem how to shape the buoy in order to achieve a high efficiency with respect to converting the wave energy into usable mechanical energy.

SUMMARY OF THE INVENTION

The above mentioned problem has according to the first aspect of the invention been solved by providing a wave-power unit with a buoy which when floating on a water surface and when seen in a direction perpendicular to the water surface has the shape of a closed loop enclosing an inner opening.

For a given floating force of the buoy this results in a larger extension in the side directions i.e. in the directions of the water surface. This is advantageous regarding the efficiency for converting the wave energy. If the large extension in the side directions would have been achieved simply by making the buoy thin and wide like a thin plate other problems would occur. By making the buoy as a closed loop enclosing an inner opening, e.g. shaped as a thorus, the water can pass through the centre of the buoy which considerably reduces these problems, and improves the dynamic of the buoy. The advantages of a buoy having this shape are particularly accentuated when the waves are high and strong. The loop shape also provides a high mechanical strength which is necessary for coping with the high forces affecting the buoy.

The energy that is converted in the generator is proportional to $$\frac{d\phi}{df}$$

which is dependent on F·v, where F is the force affecting the buoy and v its velocity in the vertical direction. i.e. in the direction of the force. With a sufficient buoyancy of the buoy the force F is at a high level. The problem is to achieve as high velocity as possible. With the shape of the buoy according to the invention the velocity becomes considerably increased in relation to traditional buoys.

By the invention it is further achieved that
the water masses above the buoy when being overflown by high breaking waves are minimized,
a high side surface against waves can be maintained in spite of a large side extension of the buoy,
it is possible to maintain a low static buoyancy with high dynamic wave absorption at low and middle sized waves, achieved by a relatively large floating surface in relation to a low displacement,
the inner opening also secures that extremely high waves do not result that the buoy will come under the water surface due to the fact that the water can pass through the inner opening upwards.

A wave power unit where the buoy has the shape according to the invention therefore results in a higher efficiency in converting the wave energy into a mechanical energy of the kind that can be used for generating electric energy.

The simplest and in many respects most efficient way of converting the mechanical energy into electric energy is to mechanically connect the buoy direct to the rotor of the buoy such that the movements of the buoy moves the rotor. If the generator is a rotary generator this movement of course has to be transferred into rotary motion. This is superfluous in case the generator is a linear generator, where the linear reciprocating rotor directly can be connected to the buoy via a wire or the like.

Although direct transfer of the buoy movements to the movements of the rotor of the generator has many advantages the present invention of course is applicable when there are various intermediate steps of converting the mechanical energy, e.g. a pump driven by the buoy, a hydraulic motor driven by the pump and a generator driven by the hydraulic motor.

According to a preferred embodiment of the invented wave power unit, the buoy thereof includes a floating body having said shape of a closed loop enclosing an inner opening.

Providing the floating body per se with that shape results in a very simple buoy construction which is easy to manufacture.

According to a further preferred embodiment the floating body includes a plurality of sections directly connected to a each other.

Thereby a very economical module concept for the manufacture of the floating body is achieved.

According to a further preferred embodiment each section is a straight pipe, and each pipes is water tight connected to adjacent pipes.

Building up the floating body with sections formed as straight pipes makes the module concept optimized regarding the economical aspects of the manufacture. By forming water tight connection between the pipes a continuous loop-shaped hollow body is formed, which is a very effective floating body.

According to a further embodiment of the invention each pipe has circular cross section.

This shape is advantageous with respect to the various flow paths of water to which the buoy will be exposed when affected by waves. Furthermore the effective floating volume in relation to the required material becomes maximized. Finally, the use of circular pipes is advantageous regarding manufacturing economy.

According to a further embodiment of the invention each pipe is made of steel.

Taking into account the material cost, the mechanical strength of the material and the possibility to resist corrosion in sea water, steel is a very advantageous alternative, in particular stainless steel.

According to a further preferred embodiment the pipes are welded to each other.

Thereby a strong and reliable connection that is water tight is achieved at reasonable low cost.

According to a further preferred embodiment the number of sections is three to twelve.

The fewer the sections are the less expensive the manufacture of the floating body becomes. Three is of course the minimum to form a closed loop. On the other hand, the higher the number of sections is, the more harmonic will the behaviour of the floating body be regarding the flow dynamics when exposed to the water waves. In most cases the balance of these considerations will be within the specified range, normally within the closer range from four to eight. A floating body made up by six sections appears in many cases be the most favourable balance.

According to a further preferred embodiment all sections have the same dimensions.

Thereby a high degree of symmetry in various respects will be achieved for the floating body, which makes its optimized for its purpose.

According to a further preferred embodiment the floating body is a regular polygon.

This embodiment represents the highest degree of symmetry of the floating body, thereby maximizing the efficiency of the buoy.

According to a further preferred embodiment the floating body is made of a material having a density lower than the density of water.

This embodiment has the advantage of eliminating the problem to secure water-tightness.

According to a further preferred embodiment the floating body is a thorus

This is a simple and harmonic shape of the floating body which makes the buoy stabile an symmetric.

According to a further preferred embodiment the thorus has circular cross section.

The circular cross section provides a minimum of disturbance when waves are flowing across it or through it.

According to a further preferred embodiment the buoy includes a plurality of floating bodies connected to each other by a plurality of connecting sections such that the floating bodies and the connecting sections together form said closed loop enclosing an inner opening.

This embodiment simplifies the problem to obtain water-tightness since each floating body can be made as a closed entity. There is thus no need to connect hollow sections water-tight to each other.

According to a further preferred embodiment each floating body has the shape of a sphere or a cylinder.

Also with this embodiment it is attained that the disturbance from the waves when flowing across the floating bodies or through the buoy will be low.

According to a further preferred embodiment each connecting section establishes a rigid connection between adjacent floating bodies.

Thereby the buoy will be stable and move as a single unit.

According to a further preferred embodiment the connection means includes at least three fastening devices connected to the buoy at different locations.

Thereby the transfer of the movements to the generator will be most effective since the complete kinetic energy of the buoy is made use of. Preferably the number of fastening devices are three and located at the corners of a regular triangle.

According to a second aspect of the invention the object is achieved in that a buoy for a wave power unit has the specific features that the buoy when floating on a water surface and when seen in a direction perpendicular to the water surface has the shape of a closed loop enclosing an inner opening.

According to preferred embodiments of the invented buoy it includes the features corresponding to the features of the buoy in the various preferred embodiments of the wave power unit set out above.

The invented buoy and the preferred embodiments thereof have the corresponding advantages as mentioned above for the invented wave power unit and the preferred embodiments thereof.

According to the fourth aspect of the invention the invented method for producing electric energy includes the specific measure that the electric energy is produced by means of a wave power unit according to the present invention or any of the preferred embodiments thereof.

The invented method as well as the invented use according to the third aspect of the invention also has the same advantages as mentioned above for the invented wave power unit and the preferred embodiments thereof.

The invention will be described more in detail through the following advantageous examples and with reference to the accompanying drawings.

DESCRIPTION OF ADVANTAGEOUS EMBODIMENTS OF THE INVENTION

Figure 1:
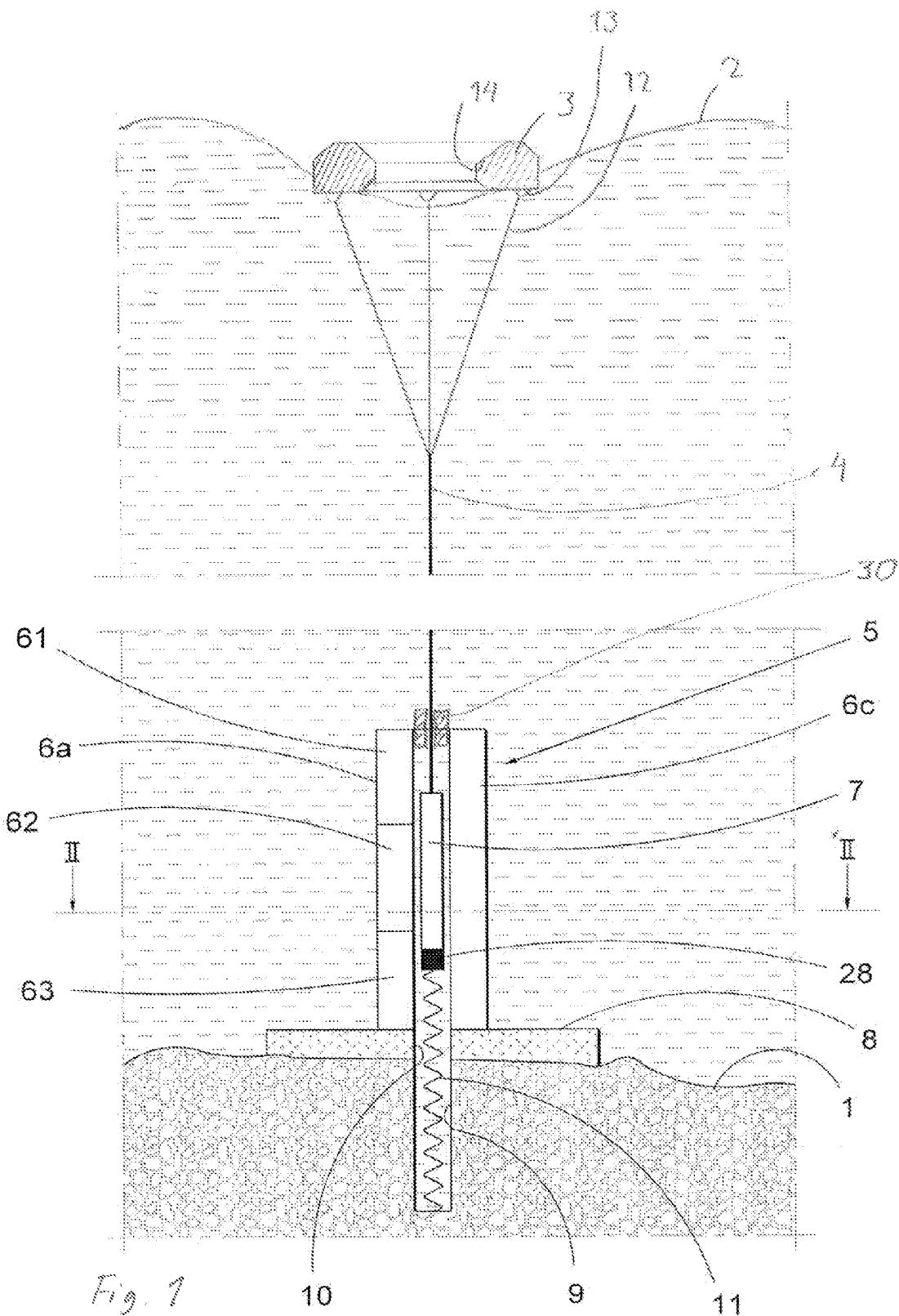
FIG. 1 is a schematic view from the side of a wave power unit in accordance with the invention.

FIG. 1 illustrates the principle of a wave-power unit in accordance with the invention. A buoy 3 is arranged to float on the surface 2 of the ocean. Waves impart a to-and-from vertical movement to the buoy 3. A linear generator 5 is anchored at the sea bed via a base plate 8 secured in the bottom. The plate may be of concrete. The stator 6a, 6c of the linear generator is secured to the base plate 8. The stator consists of four vertical pillar-like laminated stacks, only two of which are visible in the figure. The rotor 7 of the generator is arranged between the laminated stacks and is connected to the floating body 3 by a cable 4. The rotor 7 is of permanently magnetic material.

The base plate 8 has a centrally arranged hole 10 and, concentrically with this, a bottom recess 9 is made in the sea bed. The recess 9 may suitably be lined. A tension spring 11 is secured at the lower end of the recess 9 and the other end of the spring is attached to the lower end of the rotor 7. The diameter of the hole 10 in the base plate 8 and of the recess 9 is such that the rotor 7 can move freely through them.

Each laminated stack 6a, 6c is composed of a number of modules. In the example illustrated the laminated stack 6a is marked to indicate how it is divided into three vertically arranged modules 61, 62, 63, When the buoy 3 moves up and down due to the movement of the waves in the surface 2 of the ocean, this movement is transmitted via the cable 4 to the rotor 7 which thus acquires an equivalent to-and-from movement between the laminated stacks. Current is thus generated in the stator windings. The recess 9 permits the rotor to pass the whole stator in its downward movement. The tension spring 11 gives added force to the downward movement so that the cable 4 is kept taut at all times.

The spring may also be designed so that in certain situations it can also exert an upward force. The spring rate of the spring can be controlled by a control means 28 so that resonance is achieved for as much of the time as possible.

The stator is entirely or partially impregnated with VPI or silicon so that it can withstand the salt water.

When the buoy floats on the waves it will drift in the horizontal direction such that the cable will incline in relation to the vertical direction. In order to avoid that this results in that the rotor 7 will be inclined a guiding device 30 for the cable 4 is provided at the entrance of the cable in the linear generator. Thereby the rotor 7 will maintain a strict vertical motion and be centred within the stator even when the cable is inclined.

The buoy 3 is a thorus leaving an inner central opening 14. The cross sectional shape of the thorus is a polygon, formed from a rectangular base shape and with tapering inner surfaces at the top and the bottom and a tapering outer surface at the top.

The cable 4 is connected to the buoy via three minor cables 12 each being secured to the buoy through a fastening device 13. The fastening devices 13 are located in a 120° relationship to each other.

Further details regarding the function of a wave power unit in general for transforming the movements of the cable into electrical energy is not in focus for the present invention, and that function is generally known. For the understanding of that process reference is made to WO 03/058055.

It is to be understood that the design of the linear electric generator can be of different types than the one described in relation to FIG. 1. The present invention is also applicable if the linear generator is replaced by a rotary electric generator. It is also within the frames of the present invention that various mechanical conversions of the energy transferred by the cable 4 can take place before it is used for producing electric energy.

Figure 2:
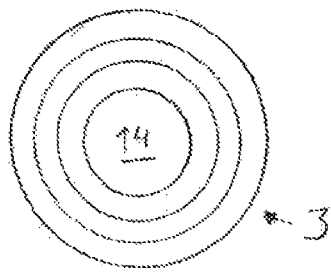
FIG. 2 is a top view of the buoy in FIG. 1.

In FIG. 2 the buoy is shown in a view from above.

Figure 3:
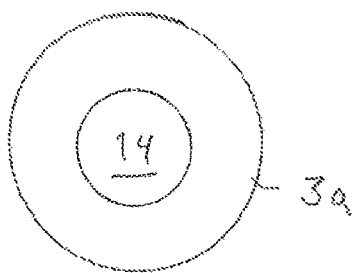
FIG. 3 is a top view of a second example of a buoy.
Figure 4:
FIG. 4 is a cross section through the buoy in FIG. 3.

FIGS. 3 and 4 illustrates an alternative embodiment of a thorus shaped buoy 3a, having a circular cross section.

The buoys in FIGS. 1 to 4 are illustrated as homogenous bodies which means that the material is a light weight material, i.e. having a density lower then that of water. In most cases, however, it is more suitable to make the thorus shaped buoy s a hollow body made of steal. The cavity can be void. i.e. air or it can be filled with a light weight material, e.g. a porous polymer.

Figure 5:
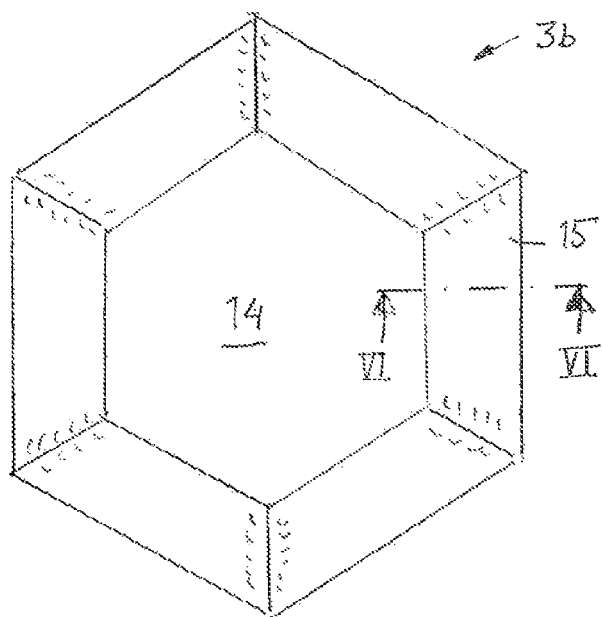
FIG. 5 is a top view of a third example of a buoy.
Figure 6:
FIG. 6 is a section along the line VI-VI of FIG. 5.

FIGS. 5 and 6 illustrates a further example of the shape of the buoy. In this case the buoy 3b is built up of six pipes 15 welded together to form a regular hexagon.

Figure 7:
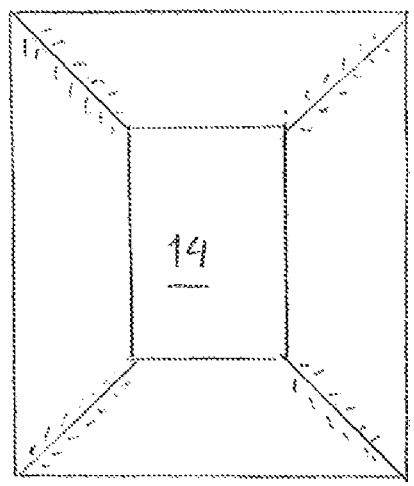
FIGS. 7-10 are top views of further examples of a buoy.

FIG. 7 illustrates an example similar to that of FIGS. 5 and 6. In this example the buoy 3c is built up of four pipes forming a rectangle.

Figure 8:
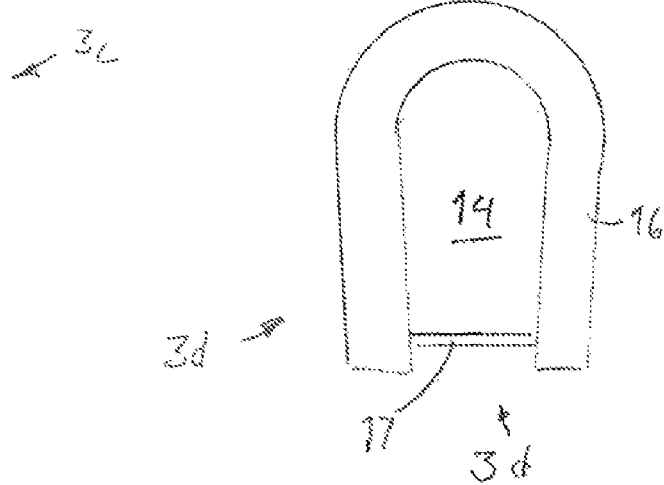

FIG. 8 illustrates an example where the buoy is made up by a horse-shoe shaped floating body 16 and a connection rod 17.

Figure 9:
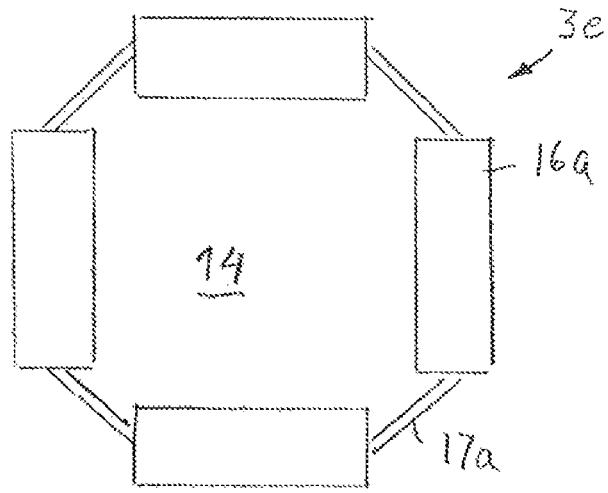

In the example illustrated in FIG. 9 the buoy 3e is made up by four floating bodies 16a, e.g. pipes which are closed at its ends and four connecting rods 17a.

Figure 10:
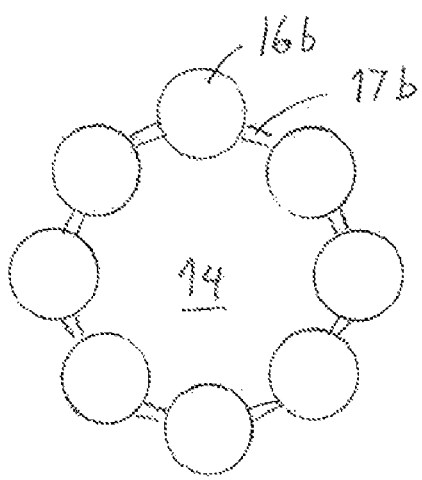

Finally FIG. 10 illustrates an example where the buoy is made up by eight spherical floating bodies 16b connected by connecting rods 17b.

As can be understood by the above examples, the buoy can have many various shapes and be constructed in various ways as long as it corresponds to what is defined in the independent claims.

Typical data for a buoy with thorus shape, such as the one in FIGS. 1 and 2 can be:

| | |
|---|---|
| Deplacement: | 9.5 m$^3$ |
| External diameter: | 4 m |
| Internal diameter: | 2 m |
| Height: | 0.8 m |
| Weight: | 1500-2000 kg |

These data are only for giving a general impression of the size that normally comes in question and are of course in no way limiting.

The invention claimed is:

1. A wave power unit comprising:
   a buoy adapted to a float on a water surface,
   an electric generator adapted to be located on a sea bed, and
   mechanical connection means connecting the buoy to the generator, the mechanical connection means including at least three fastening devices which are connected to the buoy at different locations,
   wherein the buoy comprises a floating body, which when floating on a water surface, and when seen in a direction perpendicular to the water surface, has a shape of a closed loop enclosing an inner opening, the opening being substantially free of elements related to the wave power unit, wherein the floating body includes a plurality of sections directly connected to each other, each section being a straight pipe and each pipe being watertight connected to adjacent pipes, and the floating body is hollow.

2. The wave power unit according to claim 1, wherein each pipe has circular cross section.

3. The wave power unit according to claim 2, wherein the floating body is made of a material having a density lower than the density of water.

4. The wave power unit according to claim 1, wherein each pipe is made of steel.

5. The wave power unit according to claim 4, wherein the pipes are welded to each other.

6. The wave power unit according to claim 1, wherein said floating body comprises three to twelve sections.

7. The wave power unit according to claim 6, wherein the said floating body comprises four to eight sections.

8. The wave power unit according to claim 1, wherein all sections have the same dimensions.

9. The wave power unit according to claim 8, wherein said floating body is a regular polygon.

* * * * *